United States Patent
Sauer

(10) Patent No.: US 8,864,211 B2
(45) Date of Patent: Oct. 21, 2014

(54) WIND DEFLECTOR FOR A MOTOR VEHICLE, AND MOTOR VEHICLE WITH SUCH A DEFLECTOR

(71) Applicant: BOS GmbH & Co. KG, Ostfildern (DE)

(72) Inventor: Roman Sauer, Grossbettlingen (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 13/849,275

(22) Filed: Mar. 22, 2013

(65) Prior Publication Data
US 2013/0249240 A1    Sep. 26, 2013

(30) Foreign Application Priority Data
Mar. 22, 2012 (DE) .......... 10 2012 204 669

(51) Int. Cl.
*B60J 7/22* (2006.01)
*B62D 35/00* (2006.01)

(52) U.S. Cl.
CPC ............. *B62D 35/00* (2013.01); *B60J 7/223* (2013.01); *Y10S 160/03* (2013.01)
USPC .................. 296/91; 296/180.1; 160/DIG. 3

(58) Field of Classification Search
CPC ................. B62D 35/00; B60J 7/223
USPC .......... 296/85, 91, 97.8, 180.1; 160/265, 266, 160/268.1, 370.22, DIG. 2, DIG. 3
See application file for complete search history.

(56) References Cited

U.S. PATENT DOCUMENTS

| | | | |
|---|---|---|---|
| 6,216,762 B1 * | 4/2001 | Lin | 160/370.22 |
| 7,328,936 B2 * | 2/2008 | Albrecht | 296/180.1 |
| 7,455,345 B1 * | 11/2008 | Kim | 296/97.4 |
| 7,686,375 B1 * | 3/2010 | Schlotterer et al. | 296/97.8 |
| 8,061,757 B1 * | 11/2011 | Moore et al. | 296/97.4 |
| 2004/0069424 A1 * | 4/2004 | Seel | 160/370.22 |
| 2007/0164581 A1 | 7/2007 | Ehrenberger | |
| 2009/0014136 A1 * | 1/2009 | Lekar | 160/310 |
| 2010/0289294 A1 * | 11/2010 | Lehmann et al. | 296/180.1 |
| 2011/0030905 A1 | 2/2011 | Ehrenberger et al. | |

FOREIGN PATENT DOCUMENTS

| | | |
|---|---|---|
| DE | 10 2006 001 029 B3 | 5/2007 |
| DE | 10 2008 006 157 A1 | 10/2008 |
| DE | 10 2009 037 824 A1 | 2/2011 |
| DE | 10 2010 056 233 A1 | 6/2012 |

* cited by examiner

*Primary Examiner* — Glenn Dayoan
*Assistant Examiner* — Jason S Daniels
(74) *Attorney, Agent, or Firm* — Leydig, Voit & Mayer, Ltd.

(57) ABSTRACT

A wind deflector system for a motor vehicle having an end segment for limiting extension of the wind deflector system at the top in the vertical direction, a flexible planar structure fastened to ends of the end segment, and a winding shaft for holding the wound-on planar structure. At least one swivel arm is provided, by means of which the wind deflector system can be transferred from a stowed position to a functioning position with a raised end segment, and a retainer is provided on the planar structure which is arranged, at least when in the functioning position, such that, together with the swivel arm, it restricts mobility of the planar structure relative to the swivel arm in the transverse direction of the vehicle. The system is effective for avoiding the formation of creases in the wound-up planar structure of the wind deflector system.

15 Claims, 5 Drawing Sheets

US 8,864,211 B2

WIND DEFLECTOR FOR A MOTOR VEHICLE, AND MOTOR VEHICLE WITH SUCH A DEFLECTOR

CROSS REFERENCE TO RELATED APPLICATION

This patent application claims the benefit of German Patent Application No. 10 2012 204 669.0, filed Mar. 22, 2012.

FIELD OF THE INVENTION

The present invention relates to wind deflector systems for motor vehicles, and more particularly, to a wind deflector system having an end segment limiting the wind deflector system at the top in the vertical direction of the vehicle, a flexible planar structure fastened at the end to the end segment, and a winding shaft to hold the wound-on planar structure.

BACKGROUND OF THE INVENTION

Wind deflector systems of a generic type are known for motor vehicles. They are systems with a flat segment vertically oriented during operation, which is arranged in the vehicle behind the seats and, as a result of this arrangement, results in a calming of the airflow in the passenger area. Generic wind deflector systems permit use whenever needed and can therefore be moved into an inactive, stowed position.

A generic wind deflector system, which also represents the starting point for the present invention, is disclosed in DE 10 2009 037 824 A1. The particular feature of a generic wind deflector lies in the fact that said flat segment behind the passengers is formed by a flexible planar structure, which is unwound from a winding shaft. In the case of the system in DE 10 2009 037 824 A1, it is provided that the end segment is moved by means of swivel arms into an end position assigned to the functioning position. These swivel arms comprise two arm sections that are attached on both sides of the planar structure and in that way lend the planar structure support at its side edges.

It has been found that a design of this sort is not ideal at high speeds, because it can lead to the planar structure being arched by the wind load acting on the planar structure to such an extent that its side edges bulge inwards from the area of the swivel arms. This not only has aesthetic disadvantages, but also means that as the wind deflector system is returned into its stowed position, i.e. while the planar structure is wound on, the planar structure is sometimes wound onto the winding shaft with unwelcome creases.

OBJECTS AND SUMMARY OF THE INVENTION

It is an object of the present invention to provide an improved wind deflector system that retains its aesthetic appeal when in operation, and when returned to the stowed position ensures fault-free winding of the planar structure.

The substance of the cited DE 10 2009 037 824 A1, which represents the basis for the present invention, is made the subject-matter of the present disclosure by incorporation by reference.

The object underlying the invention is solved in accordance with a primary aspect of the invention in that at least one swivel arm is provided by means of which the wind deflector system can be moved from the stowed position into the functioning position with a raised end segment. Furthermore, a retainer is provided at the planar structure which is arranged, at least in the functioning position, in such a way that together with the swivel arm it restricts the mobility of the planar structure relative to the swivel arm in the direction transverse to the vehicle.

The terms vertical direction of the vehicle, longitudinal direction of the vehicle and transverse direction of the vehicle are employed in the context of the wind deflector system in accordance with the invention in such a way that they refer to the installed position. When the wind deflector system is in the functioning position, the planar structure accordingly extends in the vertical and transverse directions of the vehicle. The vertical direction of the vehicle in which the end segment is moved in order to move the wind deflector into the functioning position corresponds to a direction that points away from the winding shaft.

The primary components of a generic wind deflector and of a deflector in accordance with the invention are the end segment, the winding shaft, and the planar structure extending between them. The winding shaft in the vehicle can be rotated about a winding axis which is fixed relative to the chassis. The planar structure, which may be fully closed or be designed with openings in the manner of a close-mesh net or similar, is wound onto the winding shaft when the wind deflector system is in the stowed position. The said end segment, which limits the wind deflector at the top in the functioning position, is provided on the end facing away from the winding shaft.

A mechanical system with at least one swivel arm is provided to shift the position of the end segment. Although designs with only one swivel arm are conceivable in theory, a wind deflector in accordance with the invention preferably comprises a symmetrical construction, and hence preferably at least two swivel arms, one of which is arranged on the right and the other on the left. For the purpose of shifting the position of the end segments, the swivel arms can preferably be swivelled by motor, being mechanically coupled to the end segment in such a way that the swivel movement necessarily results in a movement of the end segment in the vertical direction of the vehicle. With this movement, the planar structure is moved in the vertical direction of the vehicle and is at the same time unwound from the winding shaft.

In order that the planar structure still remains in a largely defined position under said high wind load at high speeds, the retainer is provided on the planar structure. This is a device provided in a fixed position on the planar structure, positively interlocking with the swivel arm and operating jointly with it in such a way that, at least when the wind deflector system is in the functioning position, it cannot be moved past the swivel arm since it has engaged positively with the swivel arm beforehand. The retainer is preferably arranged on the planar structure in such a way that it is also wound onto the winding shaft in the stowed position. If said retainer is provided on opposite side edges of the planar structure and is arranged in the functioning position on the outside of the corresponding swivel arms, the possibility is prevented that the side edges of the planar structure can slide inwards in the transverse direction of the vehicle and past the swivel arms, thereby reaching a position that is aesthetically disadvantageous and which can lead to untidy winding when the planar structure is later wound on.

The design of the swivel arms and of the retainer in such a way that it is not possible for the retainer to pass the swivel arms horizontally can be achieved in various ways. A design in which the retainer is a thickened portion of the planar structure is deemed preferable. This can for example be achieved by a simple press stud attached to the planar structure. Corresponding to this thickened portion, the associated swivel arm preferably comprises two arm sections arranged on opposite sides of the planar structure and connected to one another for a common swivel movement. These arm sections define an access slot for the planar structure, which is adjusted at least in some sections to the thickened portion in such a way that it cannot pass through the access slot. The slot is however sufficiently wide to permit unhindered movement of the planar structure itself. Only the movement of the retainer is prevented.

The two arm sections are parts of the swivel arm arranged on the opposite side of the planar structure and which can nevertheless swivel about a common axis and are connected to one another in such a way that they always perform a matching swivel movement. The access slot between these arm sections makes it possible for the swivel arm to move freely relative to the planar structure and, in the course of the transition of the wind deflector into the functioning position or into the stowed position, for it to slide over the planar structure itself with this swivel arm. At the same time, the selection of a suitable spacing between the arm sections provides an easy way of ensuring that the retainer designed as a thickened portion does not pass between the two arm sections, at least when the wind deflector is in the functioning position, and hence—relative to the transverse direction of the vehicle—cannot get into an inner region of the wind deflector system.

Another variant of the retainer and of the swivel arm provides that the swivel arm is only provided on one side of the planar structure, where in this case the retainer is designed in such a way, for instance in the manner of a hook, that it engages positively with the swivel arm provided only on one side when the force of the wind tries to pull the retainer past the swivel arm.

In a preferred embodiment of the wind deflector, it is provided that the swivel arm is, when the wind deflector system is in the stowed position, provided—relative to the vertical direction of the vehicle—above the wound-on retainer. When the wind deflector is moved from a stowed position into the functioning position, this is associated with a swivelling of the swivel arm. Since however the retainer must first be unwound from the winding shaft, if the swivel arm has already swivelled to a significant degree, the retainer may during the transition to the functioning position—relative to the transverse direction of the vehicle—first be arranged inside the swivel arm, which conflicts with the required purpose in accordance with the invention.

A design is therefore considered advantageous in which the swivel arm comprises at least two partial areas. One of these partial areas is the retaining area, which is matched in the manner described to the retainer in such a way that the mobility of the retainer relative to this retaining area in the transverse direction of the vehicle is limited when the retainer and the retaining area are positioned at the same height in the vertical direction of the vehicle. In addition to this retaining area of the swivel arm, the latter also has, in accordance with the further development described here, a passage region that is matched to the retainer on the planar structure in such a way that it permits a relative movement of the retainer past the swivel arm.

This design of the swivel arm with a passage region thus makes it possible for the retainer to be moved past the swivel arm once during the transition of the wind deflector into the functioning position. After it has reached the functioning position, however, the retainer is arranged at the height of the retaining area and can therefore no longer be moved past the swivel arm in a horizontal direction. In the functioning position, the required fixing of the position is thus achieved by the retainer.

Particularly preferable is a design of the wind deflector in accordance with the invention in which the swivel arm has a retaining edge which, through direct contact with the retainer on the planar structure, restricts its mobility in the transverse direction of the vehicle relative to the swivel arm, with this retaining edge having a domed shape such that when the swivel arm swivels and the retainer simultaneously moves in the vertical direction of the vehicle, an approximately constant spacing from the retainer is assured, at least in certain phases. The retaining edge thus has a shape that is appropriate for the different types of movement of the retainer on the one hand and of the swivel arm on the other. The retainer undergoes a vertical linear movement together with the planar structure after being unwound from the winding shaft, whereas the swivel arm performs a swivel movement parallel to the planar structure. The retaining edge provided on the swivel arm has a shape such that the retainer nevertheless maintains, at least over the predominant portion of the movement into the functioning position, a constant distance from the retaining edge. As a result, the fixing of the planar structure by the swivel arms is also achieved in an advantageous manner in the intermediate positions between the stowed position and the functioning position.

A second aspect of the invention, which is preferably implemented together with the first aspect of the design of the planar structure with retainer, provides that in a generic wind deflector, the end segment is arranged in the functioning position in such a way that the planar structure is stretched in the vertical direction of the vehicle, with the tension being preferably at least 40 N. According to this aspect of the invention, it is thus provided that the planar structure is stretched in the vertical direction towards the end of the transition into the functioning state.

In known designs, a tension is already provided in the knitted fabric, since it already results from the winding springs that are normally present. A tension of about 30 N is achieved in this way in known designs. In accordance with the invention, this value is increased in that the end segment is moved further on during transition to the functioning position after the winding shaft has already reached a position beyond which it does not release any more of the planar structure. This allows the tension in the planar structure in the functioning position to be increased further.

This can be achieved in particular in that the rotatability of the winding shaft is restricted by limiting means in such a way that during transition of the wind deflector into the functioning position it has reached a final rotational position before the functioning position is reached. During transition of the wind deflector into the functioning position, the movement of the end segment is still continued after the moment at which the winding shaft has reached its final rotational position, so that the planar structure is subjected to a tension acting in the vertical direction. The end segment is preferably moved at least another 5 mm, particularly preferably at least another 10 mm, relative to the intermediate position in which the planar structure is not yet subjected vertically to tension and the winding shaft has reached its final rotational position.

As an alternative to restricting the rotatability of the winding shaft, it is also possible to dimension the length of the planar structure as a whole such that the tension is achieved towards the end of the transition to the functioning position, after the planar structure has already been fully unwound from the winding shaft.

A wind deflector in accordance with the invention preferably has a control device which can also be arranged externally to the wind deflector and which is designed to control at least one swivel arm motor of the wind deflector. The control device is here designed to continue the movement of the swivel arm in the manner outlined above after the winding shaft has reached its final rotational position, or after the entire planar structure has been unwound from the winding shaft.

The invention furthermore relates to a convertible vehicle with a wind deflector system where the wind deflector system is designed in the manner described above.

Other objects and advantages of the invention will become apparent upon reading the following detailed description and upon reference to the drawings, in which:

Figure 1:
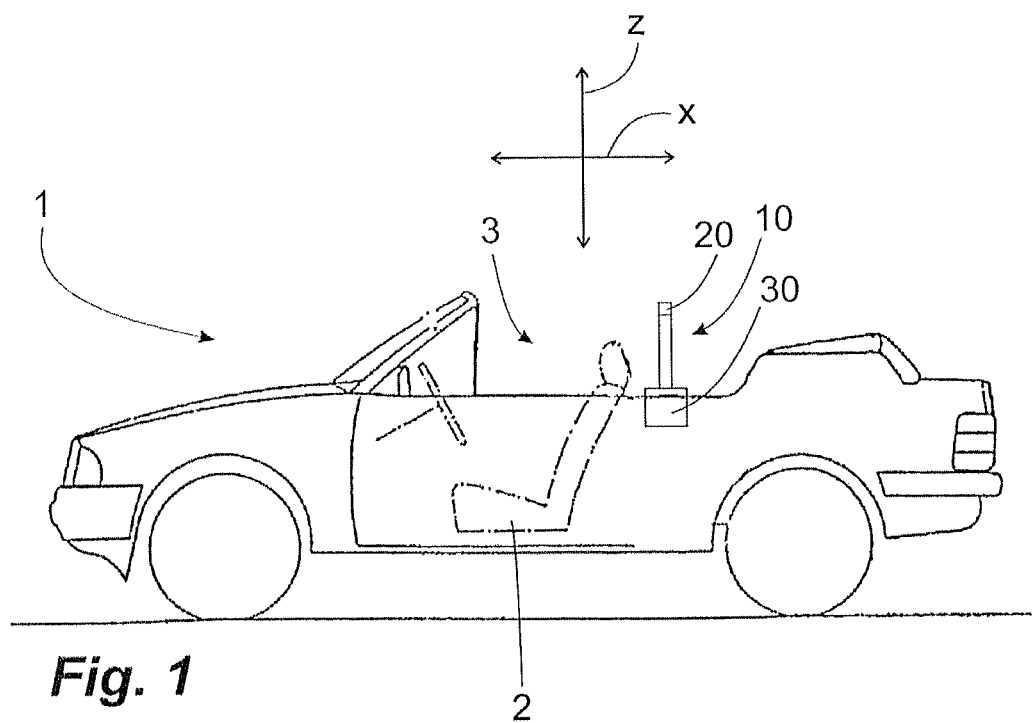
FIG. 1 is a side elevation view of a convertible motor vehicle having a wind deflector system in accordance with the invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF PREFERRED EMBODIMENTS

Referring now more particularly to FIG. 1 of the drawings, there is shown an illustrated convertible motor vehicle 1 having a wind deflector system 10 in accordance with the invention. This system can be arranged in the motor vehicle 1 behind the seats 2 and serves the purpose of avoiding unwelcome air turbulence in a passenger area 3.

Figure 2:
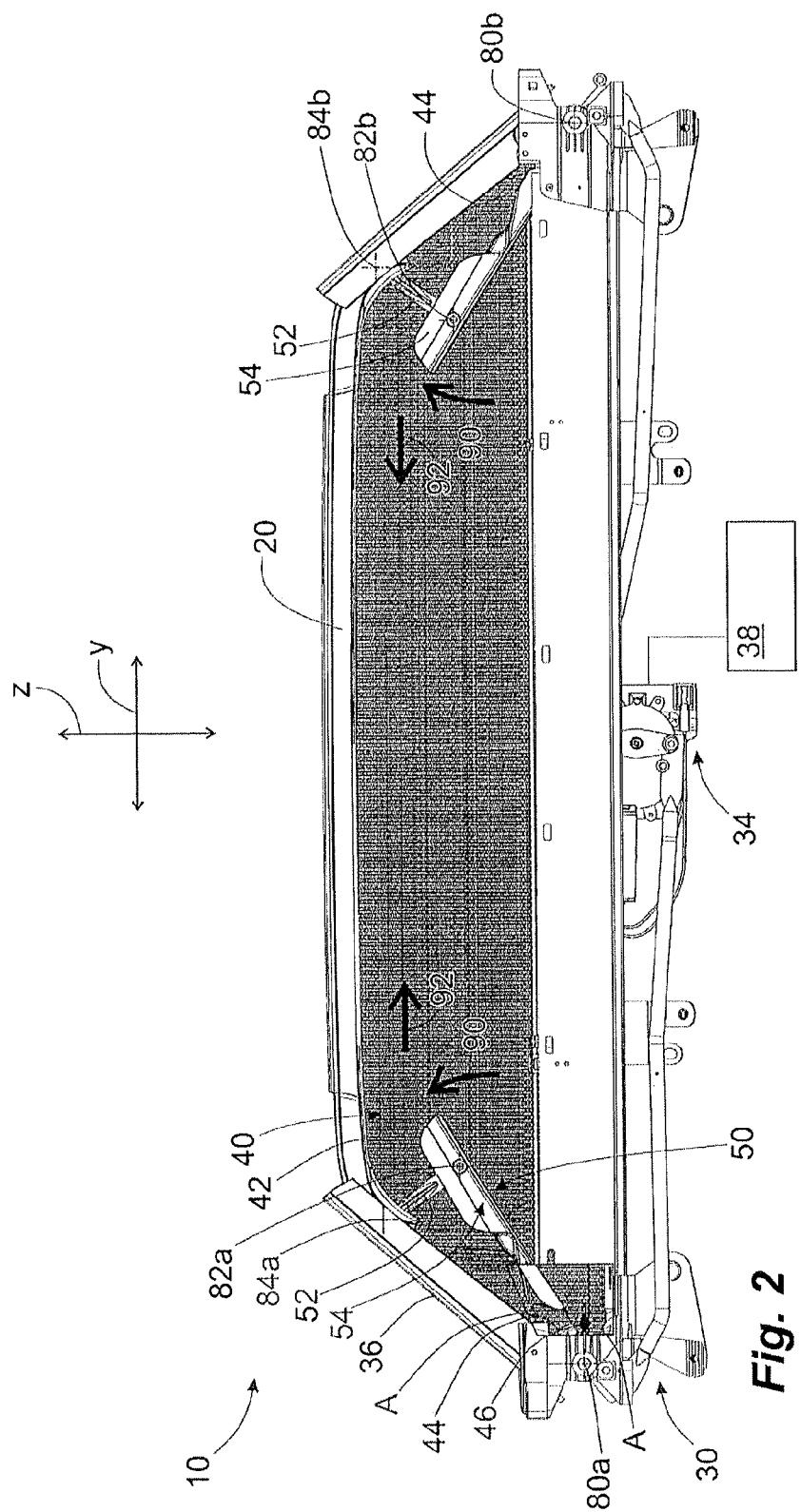
FIG. 2 is a side elevation view of the wind deflector system of the vehicle shown in FIG. 1.

In FIG. 1 the wind deflector system 10 is in the functioning position. An end segment 20 that limits the wind deflector system at the top is arranged in its upper end position, thus having the maximum distance from a base 30 of the wind deflector system 10, said base being fixed to the vehicle. FIG. 2 shows a general representation of the wind deflector system 10, where a partial region of the base 30 is cut away for better understanding.

The wind deflector system 10 comprises the base 30, which is provided on the vehicle in a fixed position. This base 30 includes, in a manner that cannot be discerned in FIG. 2, a winding shaft 32 that is aligned in a transverse vehicle direction Y and extends largely over the entire length of the base 30. A flexible planar structure 40 designed as a net is partially wound on to this winding shaft 32. The free end 42 of this planar structure 40 is attached to the end segment 20 already mentioned in connection with FIG. 1. The planar structure 40 can therefore be unwound from the winding shaft 32 in the vertical vehicle direction Z by the movement of the end segment 20 away from the base 30. In order to move the end segment 20, the ends of the base 30 and of the end segment 20, opposite one another on the left-hand and right-hand sides, are connected to one another by double levers 52, 54. These double levers 52, 54 each comprise a swivel arm 54 that can swivel about an axis of rotation 80a, 80b that is fixed relative to the base and an additional lever 52 that can swivel about a swivel axis 84a, 84b on the end segment side. The swivel arms 54 and the additional levers 52 are connected to one another to permit them to swivel about the swivel axes 82a, 82b.

The swivel movement of the swivel arms 54 can be effected by a common motor 34. Reference is made here to the previously cited DE 10 2009 037 824 A1, where this has already been extensively described and whose disclosure in this respect constitutes subject-matter of this application. The swivel movement of the swivel arms 54 in the direction of the arrows 90 results, by means of the additional levers 52, in the required shift in the position of the end segment 20 in the vertical vehicle direction Z. As an additional part of the frame of the wind deflector, caps 36 are provided on the outside, which contact the outside of the swivel arms 54 in the functioning position of the wind deflector and lend them a particularly aesthetic appearance. This too has already been described in DE 10 2009 037 824 A1.

In order that the side edges 44 of the planar structure, on the outside in the transverse vehicle direction Y, are not pulled in the direction of the arrow 92 past the swivel arms 54, the two side edges 44 of the planar structure 40 each have a retainer 46 having the nature of a press stud 46 that creates a thickened portion. When the wind deflector is in its functioning position, these press studs 46 are located on the outside of the swivel arms 54 and cannot get past them in the direction of the arrows 90 when in the functioning position. Even under a high wind load, this reliably prevents the side edges 44 of the planar structure leaving their intended position outside the swivel arms 54.

The function and in particular the movement of the retainer 46 is explained once again with the aid of the schematic representations of FIGS. 3a to 3e.

Figure 3A:
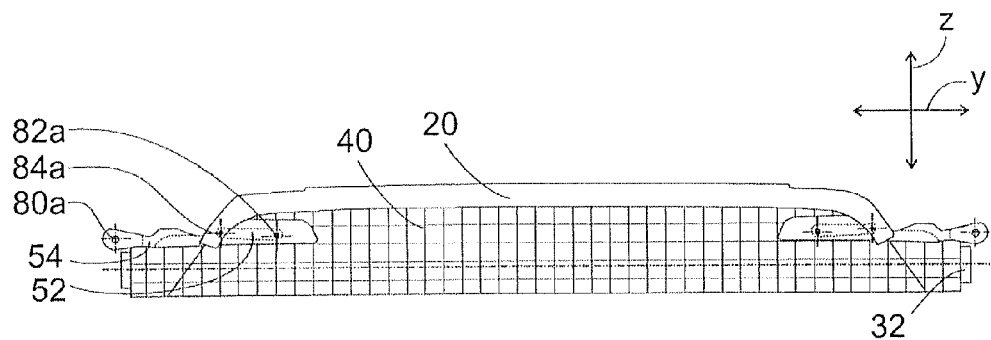
FIGS. 3a to 3e are schematic representations of the wind deflector system shown in FIG. 1 at various stages between the stowed position of FIG. 3a and the functioning position of FIG. 3e.

With reference to FIG. 3a, these schematic representations only show components of the system that are important in this context, namely the winding shaft 32 on which the planar structure 40 is still largely wound in the stowed position of FIG. 3a, the swivel arms 54 that can swivel about the swivel axes 80a, 80b on the base side, and the additional levers 52 that are swivellably hinge-mounted onto said swivel arms and whose opposite ends can swivel about the swivel axes 82a, 82b on the end segment side.

The transition of the wind deflector system into its functioning position starts with an opposing swivel movement of the swivel arms 54. As can be discerned in FIG. 3b, the swivel arms 54 together with the additional levers 52 effect the shift of the end segment 20 upwards in the vertical vehicle direction Z and hence at the same time unwinding of the planar structure 40 from the winding shaft 32.

Figure 3B:
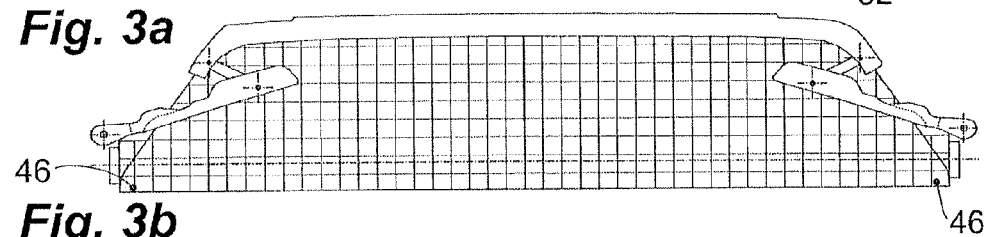
Figure 3C:
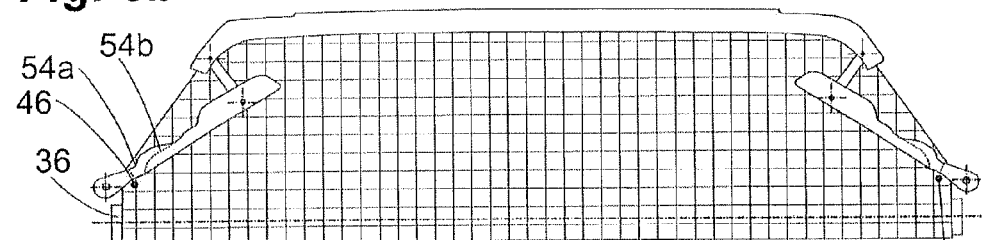

As can be seen in the transition from FIGS. 3b to 3c, as the planar structure 40 is unwound from the winding shaft 32, the two press studs 46 at the opposite side edges 44 of the planar structure 40 are also unwound. However, the press studs 46 are, due to the arrangement of the swivel arms 54 and the arrangement of the swivel axes 80a, 80b in the position shown in FIG. 3b, still inside/underneath the swivel arms 54. Since however their purpose requires them to be arranged outside the swivel arms 54 in the functioning position, they must first be guided past the swivel arms 54. To do so, the swivel arms 54 have a passage region 54a. This passage region 54a is designed in a way explained in more detail below such that it permits the press studs 46 to pass by. The transition from the FIG. 3c position to the FIG. 3d position makes this clear. The press studs 46 can pass through recesses 54c into a region outside the swivel arms 54. As soon as they have passed the respective swivel arm 54, they are positioned—with reference to a horizontal direction Y—at the level of a retaining region 54b of the swivel arms 54 which prevents a shift in the position in the direction of the arrows 92 and past the respective swivel arms 54.

Figure 3D:
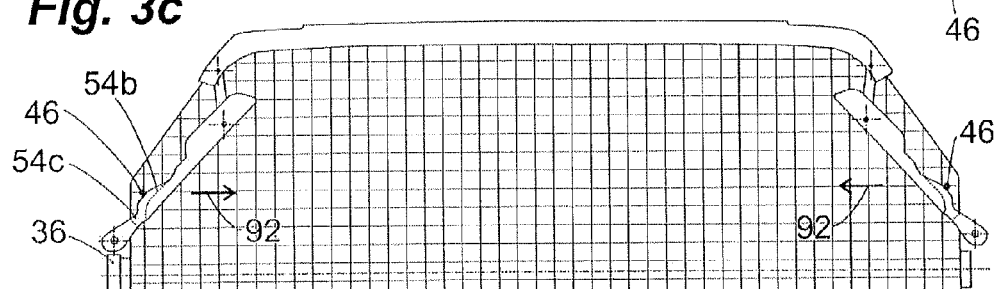

A rotation limiter 36, not specified in more detail and which can be designed in the manner disclosed in DE 102006001029 B3, is assigned to the winding shaft 32 and prevents the latter from turning further than the FIG. 3d position. This means that a continued movement of the end segment 20 beyond the FIG. 3d position cannot be achieved by continuing to unwind the planar structure 40 from the winding shaft 32, but only by stretching the planar structure 40 that has already been unwound. The swivel movement of the swivel arms 54 beyond the intermediate position of FIG. 3d thus causes the planar structure 40 to be stretched, which is advantageous to the aesthetic appeal of the planar structure even at high speeds. Fluttering of the planar structure 40 is prevented. In addition, this tension in the Z direction results in a transverse contraction of the planar structure 40, as a result of which the press studs 46 are pressed against the swivel arms 54 and are thus able to create a tension in the planar structure 40 in the transverse direction Y.

Figure 3E:
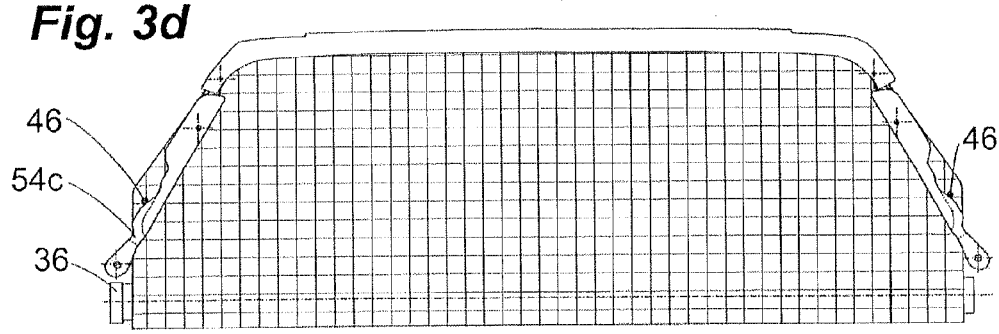

The functioning position of the wind deflector, which is illustrated in FIG. 3e, is thus highly advantageous both functionally and aesthetically.

Figure 4A:
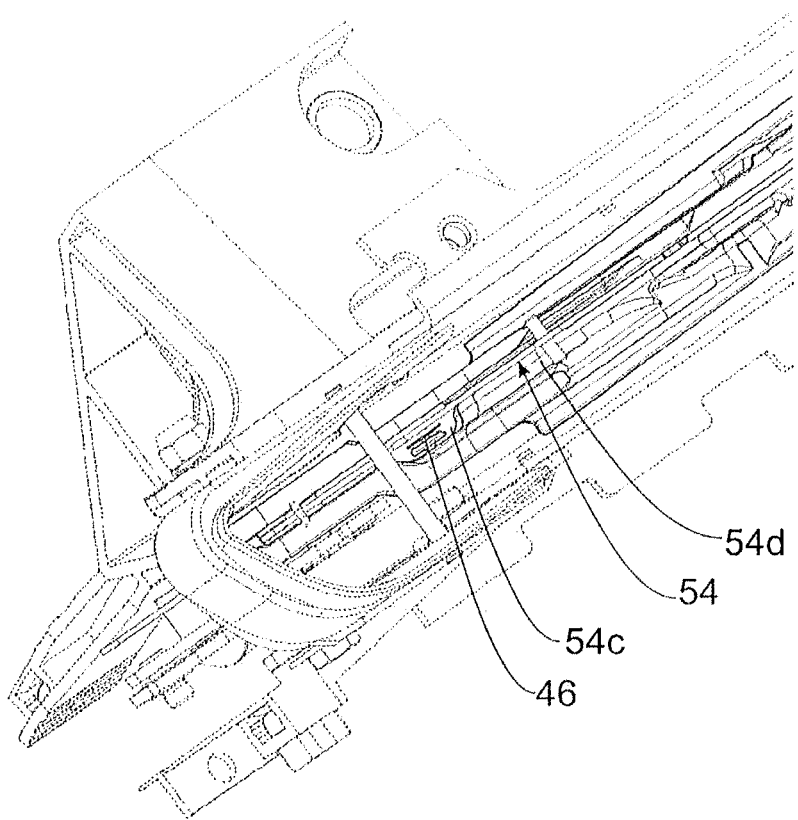
FIGS. 4a and 4b are perspective views based on the wind deflector system in the positions of FIGS. 3d and 3e.

FIGS. 4a and 4b again illustrate with the help of perspective representations the path of the press stud 46 relative to the swivel arm 54. FIG. 4a here shows an intermediate position corresponding approximately to that of FIG. 3b. In this intermediate position, the swivel arm 54 has been swivelled just to the point that the press stud 46 can change to the opposite side of the swivel arm 54 through the recess 54c.

Figure 4B:
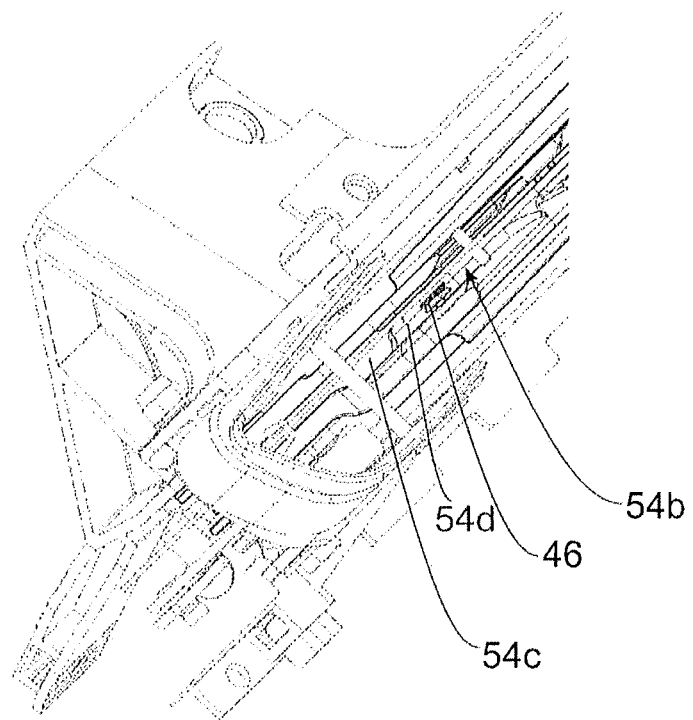

As FIG. 4b shows, as the swivel movement of the swivel arm 54 continues, the press stud 46 however reaches a retaining region in which a retaining edge 54d prevents inward movement of the press stud 46 past the swivel arm 54.

Figure 5:
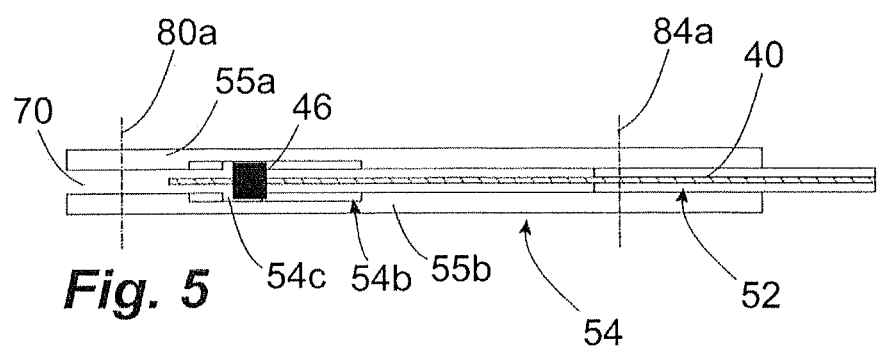
FIGS. 5 and 6 are fragmentary sections of two variants of a retainer on the planar structure side of a wind deflector system in accordance with the invention and their interaction with a swivel arm.

For the sake of better understanding, this is once again explained on the basis of the schematic FIG. 5. This shows that the swivel arm 54 consists of two arm sections 55a, 55b, between which an access slot 70 is provided. This access slot 70 is adapted to the retainer 46 such that the retainer 46 cannot pass through it. A comparatively wide recess 54c can however be seen, through which the retainer 46 can pass between the arm sections 55a, 55b during the transition of the wind deflector system into the stowed position or into the functioning position.

Figure 6:
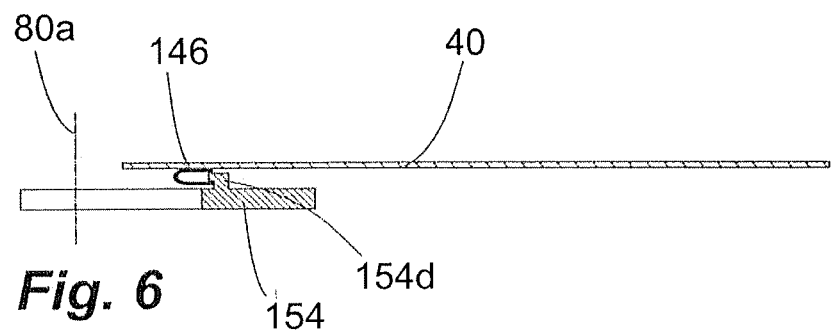

FIG. 6 shows that a swivel arm 54 consisting of two arm sections is not absolutely essential. In this variant, a swivel arm 154 is provided, arranged only on one side of the planar structure 40. In order to nevertheless prevent the side edge 44 of the planar structure 44 sliding past the swivel arm 154, a hook-like retaining clip 48 is provided on the planar structure 40 and can engage positively with a retaining edge 154d of the swivel arm 154.

The invention claimed is:

1. A wind deflector system for a motor vehicle comprising a flexible planar structure,
an end segment to which an upper end of the flexible planar structure is fastened,
a winding shaft upon which the flexible planar structure is wound in a stowed position,
at least one swivel arm for moving the end segment and planar structure to a vertically raised functioning position,
a retainer fixed on the flexible planar structure,
said retainer being wound with the flexible planar structure onto the winding shaft when in the stowed position, and
said retainer being engageable in positive interlocking fashion with the swivel arm when the planar structure is in the raised functioning position for restricting transverse movement of the planar structure relative to the swivel arm toward the stowed position when in the raised functioning position.

2. Wind deflector system according to claim 1 in which
two swivel arms are provided which extend when the wind deflector system is in the functioning position along two opposite side edges of the planar structure, where for each swivel arm at least one retainer is provided at the edge of the planar structure, which restricts the horizontal mobility of the edge in the direction of the opposite swivel arm.

3. Wind deflector system according to claim 2 in which
the retainer constitutes a thickened portion of the planar structure, and
the swivel arm comprises two arm sections that are arranged opposite one another with respect to the planar structure and are designed for a common swivel movement, where an access slot for the planar structure is provided between the arm sections, which is adjusted at least in some sections to the thickened portion in such a way that it cannot pass through the access slot.

4. Wind deflector system according to claim 1 in which
the retainer constitutes a thickened portion of the planar structure, and
the swivel arm comprises two arm sections that are arranged opposite one another with respect to the planar structure and designed for a common swivel movement, where an access slot for the planar structure is provided between the arm sections, which is adjusted at least in some sections to the thickened portion in such a way that it cannot pass through the access slot.

5. Wind deflector system according to claim 1 in which
the swivel arm comprises two partial regions, namely
a retaining region that matches the retainer on the planar structure in such a way that the mobility of the retainer relative to the retaining region of the swivel arm in the transverse vehicle direction is restricted when the retainer and the retaining region are at the same level in the vertical direction of the vehicle, and
a passage region that is matched to the retainer on the planar structure in such a way that it permits a relative movement of the retainer past the swivel arm.

6. Wind deflector system according to claim 1 in which
the wind deflector system has a first swivel arm that is swivellably hinge-mounted to a base of the wind deflector system that is fixed to the vehicle, and a second swivel arm that is swivellably hinge-mounted to the first swivel arm and to the end segment, where the first swivel arm is preferably designed in such a way that, together with the retainer it restricts the mobility of the planar structure relative to the first swivel arm in a direction transverse to the vehicle.

7. Wind deflector system according to claim 1
in which when the end segment is arranged in the functioning position of the planar structure is stretched in the vertical direction of the vehicle with a tension of at least 40 Newton.

8. Wind deflector system according to claim 7 in which
the rotatability of the winding shaft is restricted by limiting means in such a way that during transition of the wind deflector system into the functioning position it has reached a final rotational position before the functioning position is reached.

9. Wind deflector system according to claim 8 including
a control device for driving at least one swivel arm motor of the wind deflector system, where the control device is designed to continue the movement of the swivel arms after the winding shaft has reached its final rotational position.

10. Wind deflector system according to claim 7 including
a control device for driving at least one swivel arm motor of the wind deflector system, where the control device is designed to continue the movement of the swivel arms after the winding shaft has reached its final rotational position.

11. Wind deflector system according to claim 7 including
two swivel arms are provided which extend when the wind deflector system is in the functioning position along two opposite side edges of the planar structure, where for each swivel arm at least one retainer is provided at the edge of the planar structure, which restricts the horizontal mobility of the edge in the direction of the opposite swivel arm.

12. A wind deflector system according to claim 1 in which said swivel arm has a passageway for permitting movement of the retainer past the swivel arm during movement of the flexible planar structure from said stowed position to said raised functioning position.

13. A wind deflector system for a motor vehicle comprising
an end segment that limits the wind deflector system in the vertical direction of the vehicle at the top,
a flexible planar structure whose end is fastened to the end segment,
a winding shaft upon which the flexible planar structure is wound in a stowed position,
at least one swivel arm for transferring the flexible planar structure from the stowed position to a functioning position with a raised end segment,
a retainer at the planar structure arranged, at least in the functioning position, in such a way that, together with the swivel arm, the retainer restricts mobility of the planar structure relative to the swivel arm in a direction transverse to the vehicle,
said swivel arm having a retaining edge which, through direct contact with the retainer on the planar structure, restricts mobility of the planar structure relative to the swivel arm in the transverse direction of the vehicle, and
said retaining edge having a domed shape such that upon swivel movement of the swivel arm simultaneous movement of the retainer in the vertical direction of the vehicle an approximately constant spacing from the retainer is assured at least in certain phases.

14. A convertible motor vehicle comprising
a convertible vehicle body having a seated passenger area,
a wind deflection system mounted being the passenger area,
said wind deflection system having a flexible planar structure,
an end segment to which an upper end of the flexible planar structure is a fastened,
a winding shaft mounted on the vehicle body upon which the flexible planar structure is wound in a stowed position,
at least one swivel arm for moving the end segment and planar structure to a vertically raised functioning position,
a retainer fixed on the planar structure,
said retainer being wound with the flexible planar structure onto the winding shaft when in the stowed position, and
said retainer being engageable in positive interlocking fashion with the swivel arm when the planar structure is in the raised functioning position for restricting transverse movement of the planar structure relative to the swivel arm toward the stowed position when in the raised functioning position.

15. The convertible vehicle according to claim 14 including
two swivel arms are provided which extend when the wind deflector system is in the functioning position along two opposite side edges of the planar structure, where for each swivel arm at least one retainer is provided at the edge of the planar structure, which restricts the horizontal mobility of the edge in the direction of the opposite swivel arm.

* * * * *